United States Patent [19]

Russell

[11] Patent Number: 5,433,356
[45] Date of Patent: Jul. 18, 1995

[54] VISE ADAPTED FOR MOUNTING TO A TRAILER RECEIVER BY ITS INNER MEMBER

[76] Inventor: Jay A. Russell, 1016 Rainer Ave., Pacifica, Calif. 94044

[21] Appl. No.: 89,313

[22] Filed: Jul. 12, 1993

[51] Int. Cl.⁶ .................................................. B60R 7/00
[52] U.S. Cl. ................................... 224/519; 224/521; 224/523; 224/536; 269/244; 269/101
[58] Field of Search .............. 224/42.45 R, 42.42, 224/42.41, 42.03 R, 42.03 B; 269/244, 101

[56] References Cited

U.S. PATENT DOCUMENTS 2,317,195  4/1943  Husted .............................. 269/244
5,267,748 12/1993  Curran .......................... 224/42.03 R Primary Examiner—Henry J. Recla
Assistant Examiner—David J. Wolczak

[57] ABSTRACT

An engineer's vise (16) having a fixed inner member (20) with a stationary jaw (24) and an elongate extension (22) for inserting into and mounting to a trailer receiver (18) attached to a motor vehicle (37), thus providing a vise for use in the field. The vise has a movable outer member (30) and jaw (32) operated by a threaded shaft (34) and turned by a handle (38). The vise can be securely attached to receiver by a pin (53) in one of four positions: upright, inverted, on its right side, on its left side. It can be quickly and easily removed and stored for safe keeping.

9 Claims, 5 Drawing Sheets

1

VISE ADAPTED FOR MOUNTING TO A TRAILER RECEIVER BY ITS INNER MEMBER

BACKGROUND—FIELD OF INVENTION

The present invention relates to tools, in particular to an engineer's vise, adapted to be mounted by its inner member to a trailer receiver, to suit it for use in the field. The vise is so designed that, as a threaded screw is turned, the slidable outer member jaw moves in relation to the fixed inner member.

BACKGROUND—DESCRIPTION OF PRIOR-ART

In prior art engineer's vises, the inner member comprises a sliding member with an integral jaw which moves toward, or away from, the outer member's stationary jaw when the user turns a threaded screw. Such vises work best when mounted by bolting the outer member and its integral stationary jaw to a workbench.

While this method is suitable for use on a bench in a workshop, it is inappropriate for use by a technician or engineer working in the field.

In order to make field work possible, attempts have been made to mount prior art vises to vehicle bumper bars, or else to the bed of a truck or pick-up. Such mountings, however, usually provide inadequate working space around the vise. Also, in order to remove the vise for safe-keeping in the vehicle or elsewhere, the mounting bolts must be removed us well, which is time-consuming. Also, engineer's vises open only a few inches; for instance, a 4" vise usually opens to only 4½ inches.

OBJECTS AND ADVANTAGES

Several objects and advantages of the present invention are to provide an engineer's vise 1) which can be mounted stably to the trailer receiver of a truck or pick-up; 2) which can be quickly and easily mounted and removed without the need of mounting bolts; 3) which provides sufficient clamping strength to be useful for holding piping for plumbers, machinery for farmers, etc. while out in the field.

Other objects and advantages are: 4) to provide a vise which can be mounted upright, sideways, or even inverted, and 5) which can be instantly removed and stored to prevent theft. Other objects and advantages are to provide a vise in which, contrary to the prior art, 6) the outer member is used for the movable jaw and the inner member for the fixed one, thus allowing for 7) more maneuverable workspace around the vise. Another object and advantage is to 8) provide an engineer's vise which will open to at least 8 inches.

Figure 1:
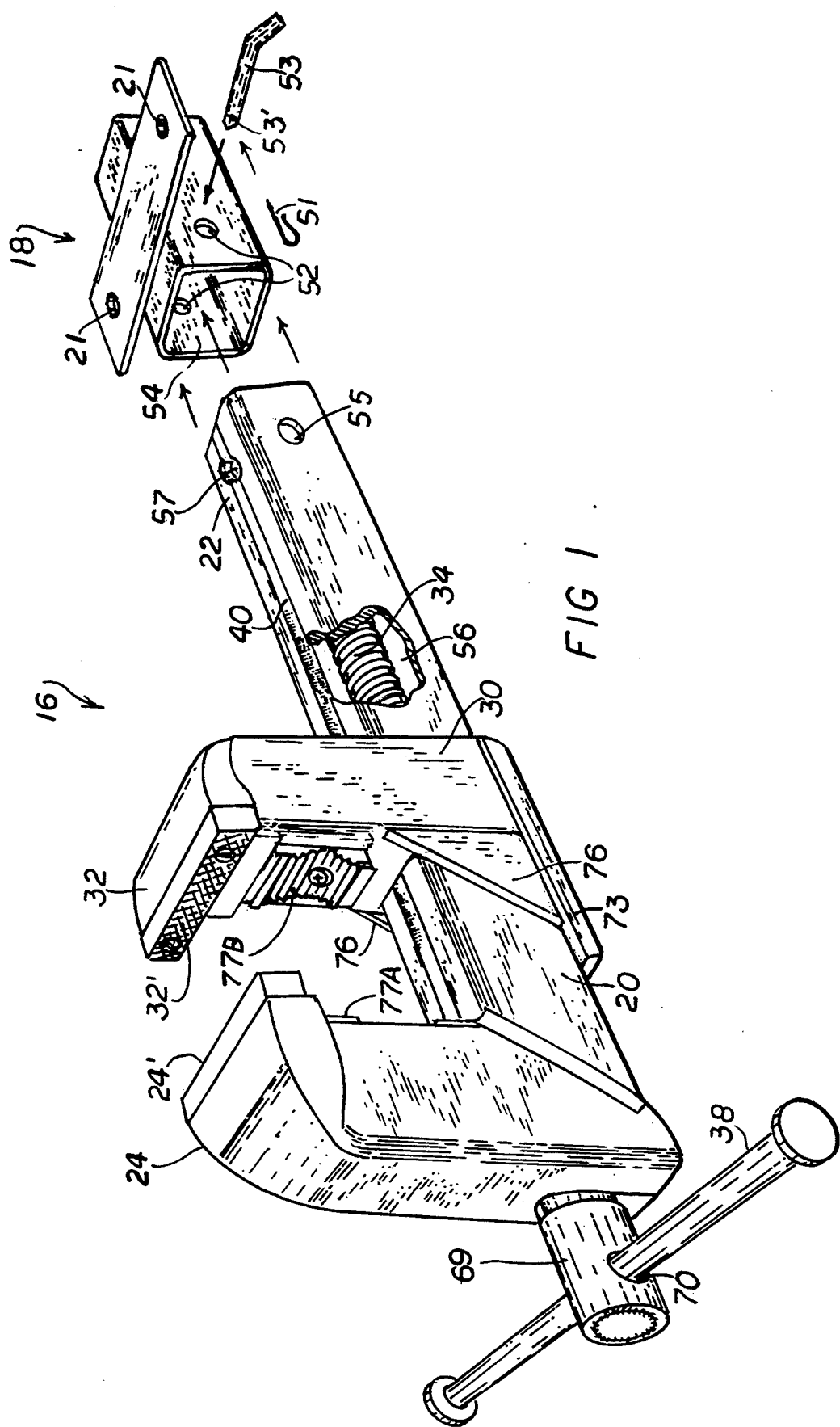
FIG. 1 is a part-cutaway perspective view of the vise of the present invention.

| Reference Numerals | |
| --- | --- |
| 16 | vise |
| 18 | receiver |
| 19 | bolts |
| 20 | inner member |
| 21 | holes |
| 22 | extension |
| 24 | integral jaw |
| 24' | jaw face |
| 30 | outer member |
| 32 | integral jaw |
| 32' | jaw face |
| 33 | inner threaded lumen |
| 34 | threaded shaft |
| 35 | threads |
| 37 | vehicle |
| 38 | handle |
| 40 | slot |
| 41 | prior art vise (FIG. 3) |
| 42 | outer member |
| 43 | base |
| 44 | integral jaw |
| 45 | workbench |
| 46 | inner member |
| 47 | bolts |
| 48 | integral jaw |
| 49 | threaded shaft |
| 50 | handle |
| 51 | clip |
| 52 | hole |
| 53 | pin |
| 53' | pinhole |
| 54 | socket |
| 55 | transverse holes |
| 56 | lumen |
| 57 | vertical holes |
| 60 | reduced diameter |
| 62 | bush bearing |
| 63 | opposite end |
| 64 | support |
| 65 | ball-thrust bearing |
| 66 | bearing surface |
| 67 | circular flange |
| 68 | flanged socket |
| 69 | ferrule |
| 70 | hole |
| 72 | projecting member |
| 73 | base plate |
| 74 | upper end |
| 75 | lower end |
| 76 | side gussets |
| 77A & 77B | pipe vise jaw inserts |

DESCRIPTION OF PREFERRED EMBODIMENT (FIGS. 1-4)

FIG. 1 shows a vise 16 for mounting to a trailer receiver 18. Vise 16 differs from other vises in that its "inner" member 20, which includes an extension 22 together with an integral jaw 24, is the "stationary" rather than the "sliding" or "moving" member. Conversely, the "outer" member 30, which includes an integral jaw 32, is the movable member, slidably mounted on the stationary inner member 20 and controlled by a threaded shaft 34 operated by a handle 38.

Figure 2:
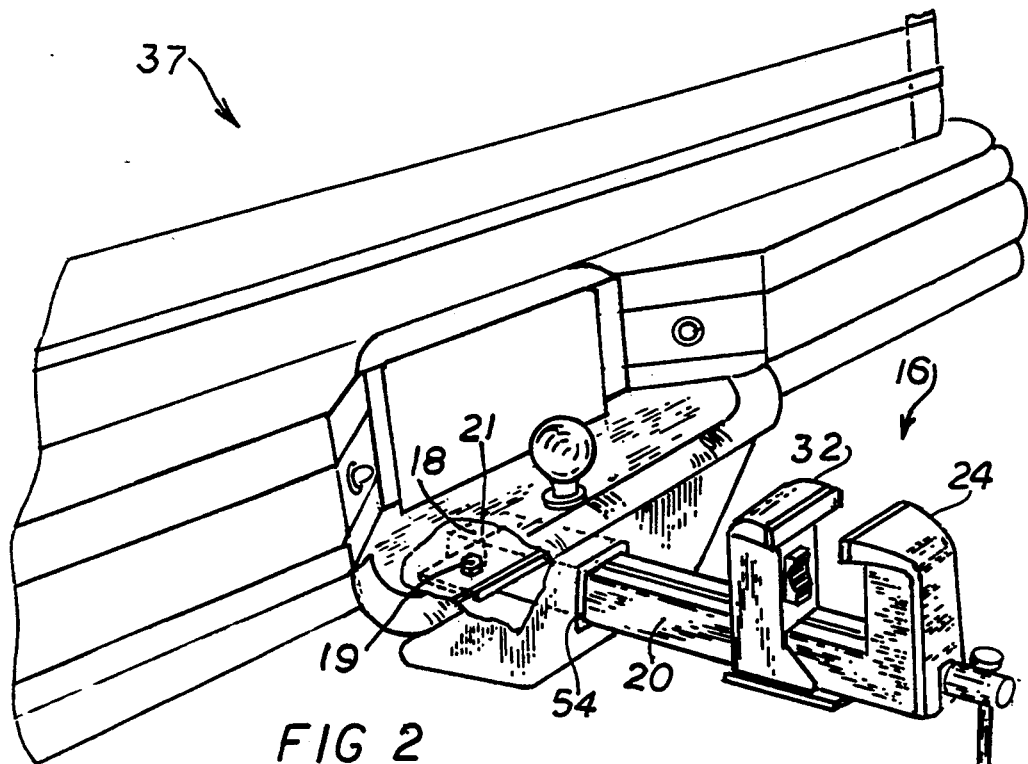
FIG. 2 is a part-cutaway perspective view of the vise of FIG. 1 attached to a trailer receiver on a vehicle.

Vise 16 (FIG. 2) is adapted to be anchored to a trailer receiver 18 which is fitted by bolts 19 passing through holes 21 in receiver 18, and then through holes in the infrastructure in the rear of a motor vehicle 37.

PRIOR ART VISE (FIG. 3)

Figure 3:
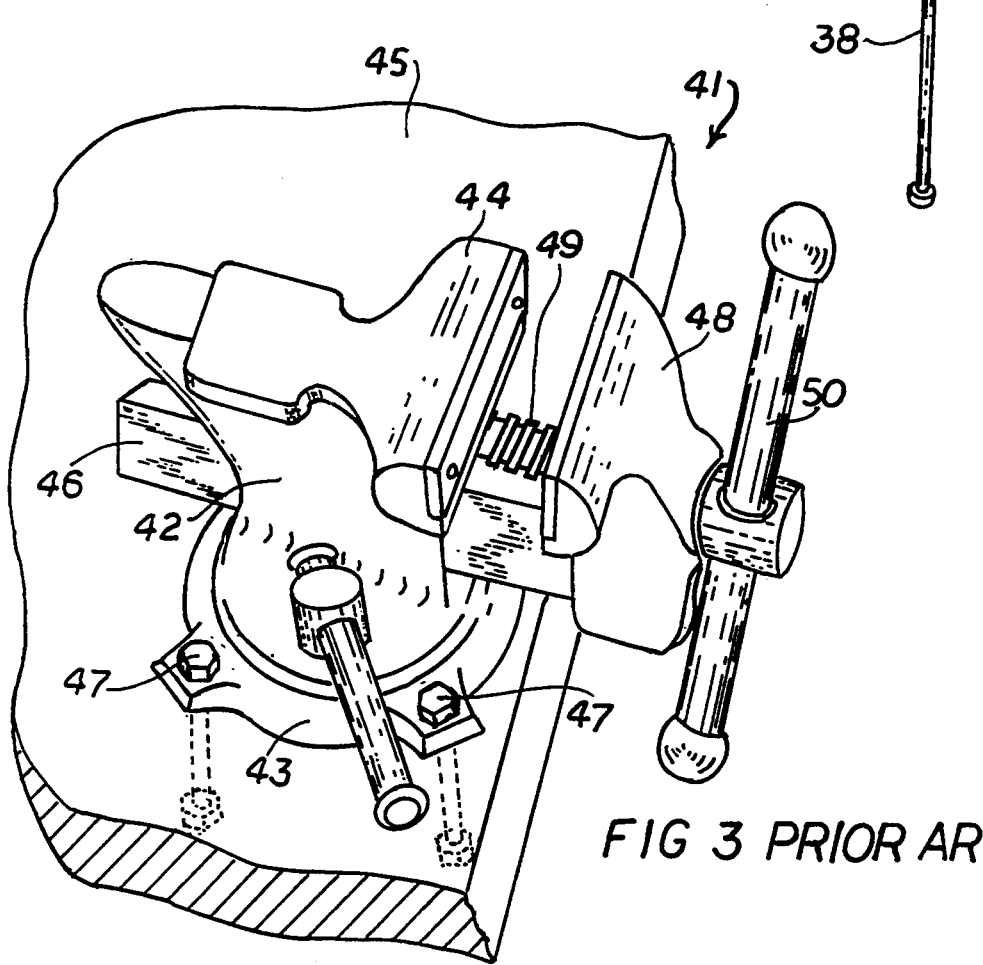
FIG. 3 is a perspective view of a prior art engineer's vise.

FIG. 3 shows a prior art engineer's vise 41 in which the "outer" member 42 and its integral jaw 44 are secured to a workbench 45 by bolts 47 inserted through its base 43 in a stationary position. Its inner member 46 and its integral jaw 48 comprise the movable jaw and are controlled by threaded shaft 49 and handle 50.

INNER MEMBER (FIGS. 1, 2, 4–8)

Vise 16 (FIGS. 1, 2 & 4) comprises elongate inner member 20, mounting extension 22 at first end, and integral jaw 24 at second end.

Inner member and extension has a slot 40 extending for the full length along its upper surface. Extension 22 is of square section and sized to fit neatly into socket 54 of trailer receiver 18. It also has two transversely drilled holes 55 and two vertically drilled holes 57.

These holes are used for mounting the vise to a trailer receiver 18 by inserting extension 22 into socket 54 until holes 55 and 52 are aligned, then inserting pin 53 through holes 52 and 55 to prevent unintentional disengagement. Pin 53 is secured in place by clip 51, inserted into pinhole 53' in pin 53.

Figure 5:
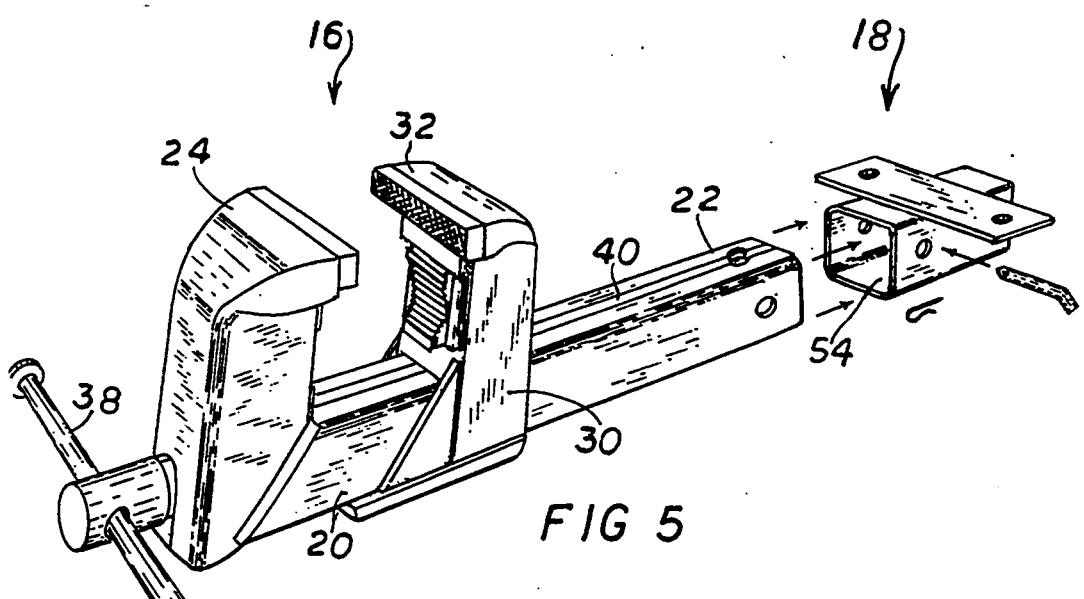
FIG. 5 is a perspective view of the vise positioned for attaching to a trailer receiver in an upright position.
Figure 6:
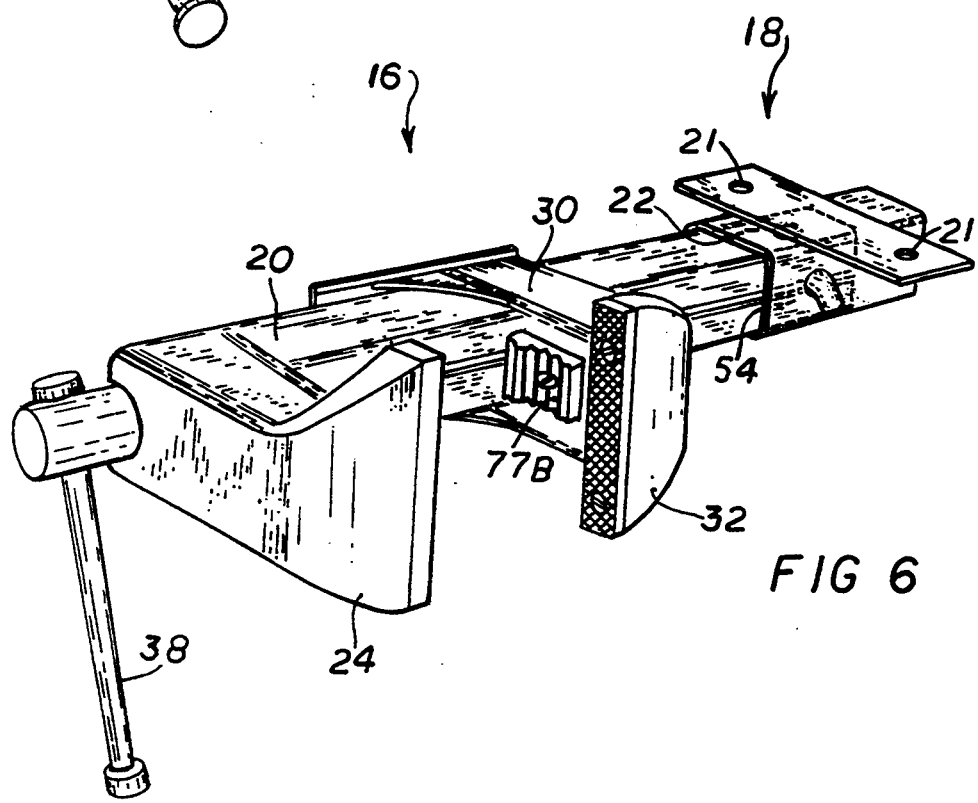
FIG. 6 is a perspective view of the vise attached to a trailer receiver positioned on its right side.
Figure 7:
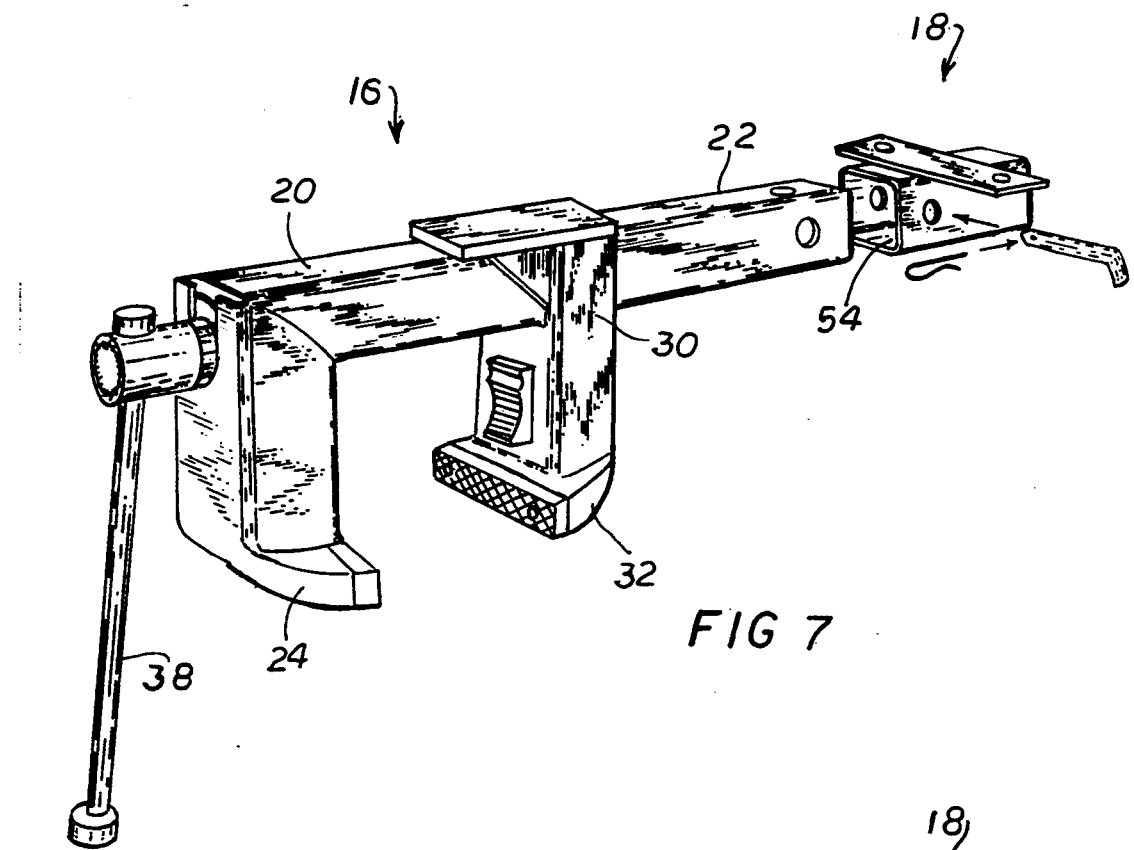
FIG. 7 is a perspective view of the vise positioned for attaching to a trailer receiver, inverted.
Figure 8:
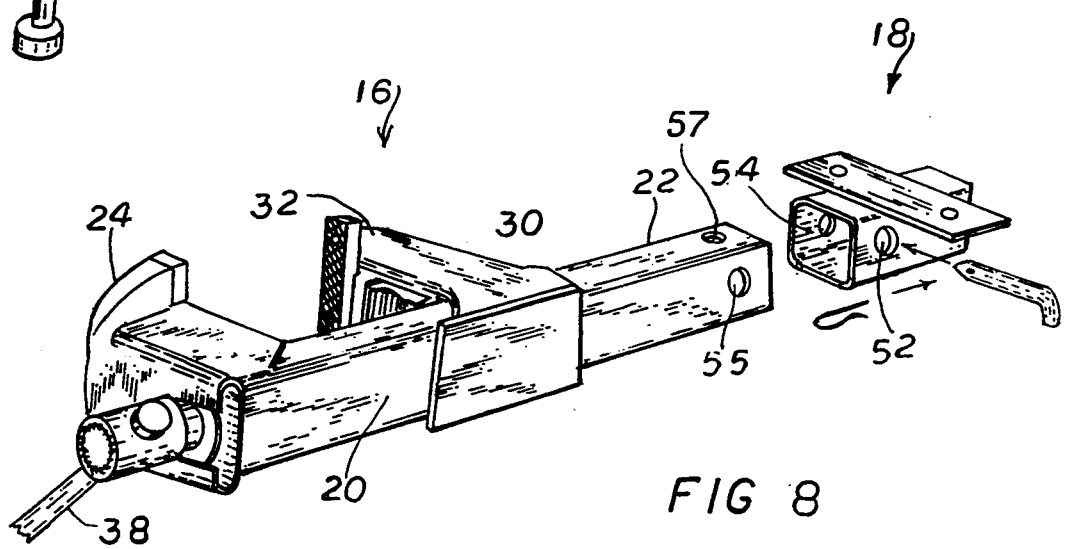
FIG. 8 is a perspective view of the vise positioned for attaching to a trailer receiver, positioned on its left side.

The vise can be mounted into any one of four possible positions, namely, upright (FIG. 5), on its right side (FIG. 6), inverted (FIG. 7), and on its left side (FIG. 8).

OUTER MEMBER (FIGS. 1 & 4)

Figure 4:
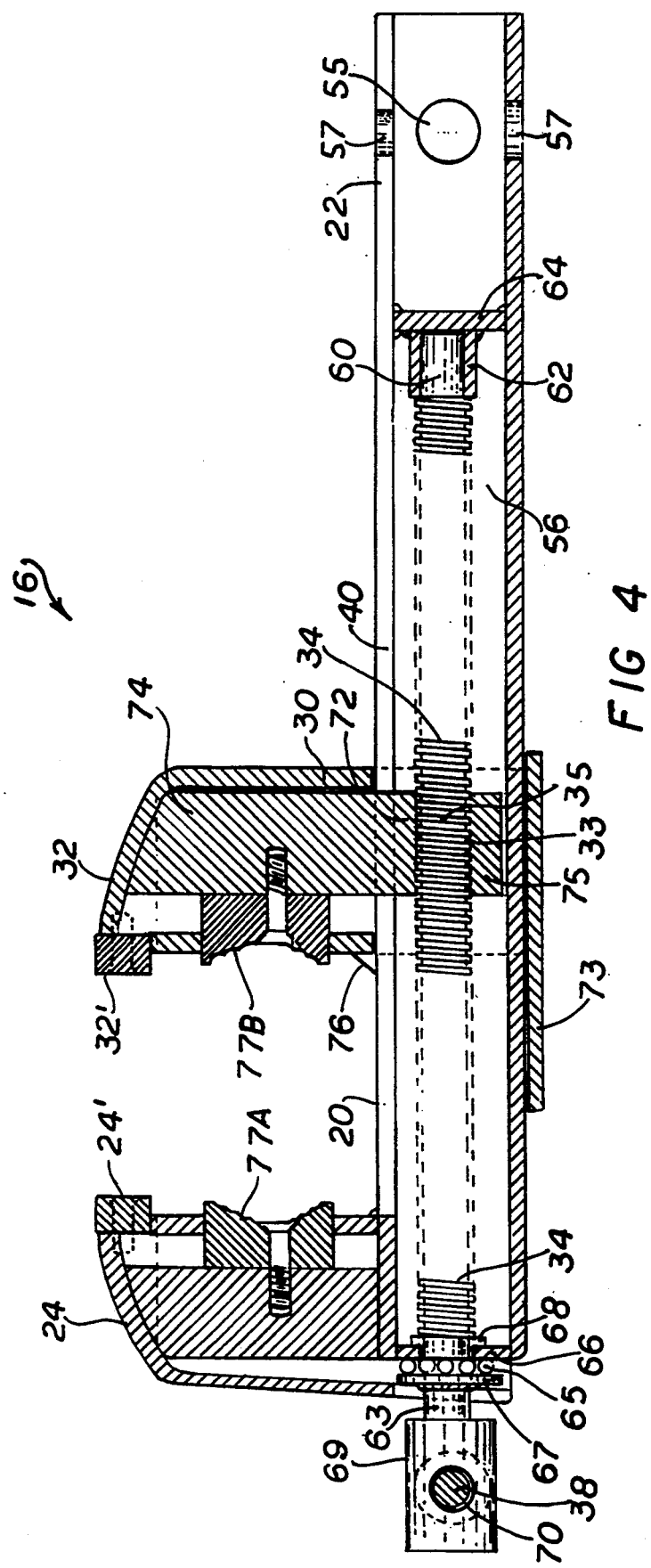
FIG. 4 is a sectional view of the vise of FIG. 1.

Referring to FIGS. 1 & 4, an elongate inner member 20 provides a hollow inner lumen 56, in which is disposed a threaded shaft 34. Threaded shaft 34 has a reduced diameter 60 at its distal end (FIG. 4). This end is located by a common bush bearing 62, which in turn is welded to support 64 within lumen 56.

Opposite end 63 of threaded shaft 34 (FIG. 4) is also reduced in diameter and is fitted with a ball-thrust bearing 65. Bearing 65 operates between circular flange 67 on shaft 34 and a stationary bearing surface 66, which is welded to the second end of inner member 20.

Bearing 65 thus provides a pressure-thrust bearing for the closing of jaws 32 and 24 of vise 16. A flanged socket 68 provides a bearing surface in the opposite direction, i.e., to take thrust pressure which occurs during the opening of jaws 32 and 24. Threaded shaft 34 further has a ferrule 69 welded to shaft 34 through which hole 70 is drilled to accommodate handle 38.

Sliding outer member 30 has an inwardly projecting member 72 (FIG. 4) which passes downwardly through slot 40. Its upper end 74 is rigidly attached to outer member 30 and jaw 32. Its lower end 75 possesses an inner threaded lumen 33, which engages a plurality of threads 35 on threaded shaft 34, such that when threaded shaft 34 is turned by handle 38, outer member 30, together with jaw 32, will be caused to slide along inner member 20.

Outer member 30 has an extended base plate 73, which is reinforced by two side gussets 76, welded to base plate 73 and outer member 30 (FIG. 1). Gussets 76 provide reinforcement between base plate 73 and outer member 30, and more stability for outer member 30 and jaw 32, when clamping pressures are applied to a workpiece clamped between jaws 24 and 32 (or pipe vise jaws 77A and 77B).

Stationary jaw 24 and movable jaw 32 are also fitted with pipe-vise jaw inserts 77A and 77B (FIGS. 1 & 4). These are positioned exactly opposite each other and screwed to inner and outer members respectively.

Pipe jaw inserts 77A and 77B, as well as jaw faces 24' and 32' are attached by screws and are thus removable and replaceable when necessary due to breakage or wear.

MATERIALS, DIMENSIONS, AND OPERATION

Preferably the vise is made of steel. However, any other suitable material can be used. The prototype of the present invention has 10 cm (4") wide jaws, which can be opened to 21.3 cm (8.375"). The pipe-vise jaw will hold from a 1 cm (0.375") O.D. pipe up to a 9 cm (3½") O.D. pipe.

The length of the inner member is 51 cm (20") and is made from 5 cm×5 cm×6 mm (2"×2"×¼") square steel tubing with rounded corners. Other dimensions are to scale. However, larger, smaller, longer, or shorter dimensions can be used.

For holding workpieces, the vise is generally used like any prior art engineer's vise. However, it has important additional uses, such as the capacity to transport a workpiece, held securely between the vise jaws, while the vehicle is in motion. The vise can also be used, in conjunction with the vehicle, for pulling or pushing workpieces, or even used for holding a portable drill press for drilling work. Turned on its side, it can hold a heavy door or a steel frame vertically. It can also hold a heavy post vertically, positioning it prior to releasing it into a hole in the ground, for fence-building or other construction work. It can also be used for holding a tent post vertically while erecting a tent over and/or behind the vehicle.

The vise can be adapted for use in a workshop, simply by bolting a trailer receiver to a work bench, and then attaching the vise to it. This allows the user to enjoy the many special advantages of the vise within a workshop setting.

SUMMARY, RAMIFICATIONS AND SCOPE

Thus, the reader will see that I have provided an engineer's vise which can easily be mounted to a trailer receiver and can just as easily be removed for safe storage. One unique feature of this vise is that it is mounted by its extended inner member, instead of the outer member, as is commonly done. Still another feature of the present invention is that the outer member and its integral jaw becomes the moving jaw, controlled by a handle on the threaded shaft.

This arrangement provides many advantages over the common engineer's vises, making it uniquely suitable for use in the field. When the vise is mounted on a trailer receiver, the clamping jaws are distanced from the vehicle, thus leaving plenty of room for the user to move and work.

Another convenient feature is the incorporation of separate pipe jaws for holding round work pieces, such as lengths of water pipe. Yet another advantageous feature is that both sets of jaws can be used either in the horizontal or vertical position, simply by withdrawing the vise from its mounting and turning it ninety degrees and remounting it.

Turned on its side, the vise of this invention can hold a heavy door or a steel frame vertically. It can also be used to hold a post prior to releasing it to drop into a hole. It can also be used to hold a tent post vertically for erecting a tent over and/or behind the vehicle.

Another advantage is that, while most vises with 4" jaws can be opened to no more than approximately 4½", the 4" jaws on this vise can be opened to approximately 8½".

The vise can also be used in a workshop, simply by bolting a trailer receiver to a work bench, then attaching the vise. This use allows the user to enjoy special advantages of the vise within a workshop setting.

While the above description contains many specificities, the reader should not construe these as limitations on the scope of the invention, but merely as exemplifications of preferred embodiments thereof. Those skilled in the art will envision that many other variations are within its scope. For example, skilled artisans will readily be able to change the dimensions and shapes of the various embodiments, such as by making the jaws larger or wider or of different metal or even plastic.

Accordingly, the reader is requested to determine the scope of the invention by the appended claims and their legal equivalents, and not by the examples which have been given.

I claim:

1. A vise for mounting to a trailer receiver of the type having a square socket, said vise comprising:
   a stationary jaw,
   a movable jaw,
   means for moving said movable jaw with respect to said stationary jaw,
   a square mounting extension attached to said vise, said mounting extension being sized to be received in said socket, said mounting extension being insertable into said socket in four possible positions which are ninety degrees apart,
   and means for removably fastening said mounting extension within said socket, comprising:
   a first hole through said mounting extension, a second hole through said mounting extension, said second hole being at a right angle to said first hole,
   at least one corresponding hole through said socket,
   and a pin insertable through said hole in said socket and one of the holes in said mounting extension to removably fasten said mounting extension in one of said four possible positions within said socket.

2. The vise of claim 1 wherein said means for moving said movable jaw with respect to said stationary jaw comprises: an elongate inner member having a first end and a second end, means for fixedly mounting said stationary jaw to said first end,
   means for slidably mounting said movable jaw on said inner member intermediate said first end and said second end,
   a threaded shaft, means for rotatably mounting said threaded shaft, handle means for rotating said threaded shaft, and a threaded means attached to said movable jaw which engages said threaded shaft.

3. The vise of claim 2 wherein said threaded shaft is rotatably mounted within said elongate inner member.

4. The vise of claim 2 wherein said rectangular mounting extension is formed integrally with said second end of said elongate inner member.

5. A vise for mounting to a trailer receiver of the type having a square socket, said vise comprising:
   an elongate inner member having a first end and a second end, said inner member having a hollow cross section having an outer wall surrounding a hollow inner lumen, said inner member having a longitudinal slot through said outer wall connecting to said inner lumen along at least a portion of the distance from said first end to said second end,
   a stationary jaw mounted on said first end of said inner member,
   a movable jaw slidably mounted on said inner member intermediate said first end and said second end,
   a threaded shaft disposed within said hollow inner lumen of said inner member, means for rotatably mounting said threaded shaft within said inner member, handle means for rotating said threaded shaft,
   a threaded means which engages said threaded shaft, said movable jaw being attached to said threaded means through said longitudinal slot,
   a square mounting extension attached to said second end of said inner member, said mounting extension being sized to be received in said socket of said trailer receiver, said mounting extension being insertable into said socket in four possible positions which are ninety degrees apart,
   and means for removably fastening said mounting extension within said socket, comprising:
   a first hole through said mounting extension, a second hole through said mounting extension, said second hole being at a right angle to said first hole,
   at least one corresponding hole through said socket.
   and a pin insertable through said hole in said socket and one of the holes in said mounting extension to removably fasten said mounting extension in one of said four possible positions within said socket.

6. The vise of claim 5 wherein said rectangular mounting extension is formed integrally with said second end of said elongate inner member.

7. In combination:
   a trailer receiver, said trailer receiver having a socket and means for attaching said trailer receiver to a vehicle,
   a vise, said vise having a square mounting extension attached thereto, said mounting extension being sized to be received in said socket, said mounting extension being insertable into said socket in four possible positions which are ninety degrees apart,
   and means for removably fastening said mounting extension within said socket, comprising:
   a first hole through said mounting extension, a second hole through said mounting extension, said second hole being at a right angle to said first hole,
   at least one corresponding hole through said socket,
   and a pin insertable through said hole in said socket and one of the holes in said mounting extension to removably fasten said mounting extension in one of said four possible positions within said socket.

8. The combination of claim 7 wherein said vise further comprises:
   a stationary jaw,
   a movable jaw,
   an elongate inner member having a first end and a second end,
   means for fixedly mounting said stationary jaw to said first end,
   means for slidably mounting said movable jaw on said inner member intermediate said first end and said second end,
   a threaded shaft, means for rotatably mounting said threaded shaft, handle means for rotating said threaded shaft, and a threaded means attached to said movable jaw which engages said threaded shaft.

9. The combination of claim 8 wherein said mounting extension is formed integrally with said second end of said elongate inner member.

* * * * *